United States Patent [19]

Wichterle et al.

[11] Patent Number: 4,609,337

[45] Date of Patent: Sep. 2, 1986

[54] APPARATUS FOR INSERTING MOLDS FILLED WITH A MONOMER MIXTURE INTO ROTATING POLYMERIZATION COLUMNS

[75] Inventors: Otto Wichterle, Prague; Vladimir Havlin, Roztoky u Prahy, both of Czechoslovakia

[73] Assignee: Ceskoslovenska Akademie Ved, Czechoslovakia

[21] Appl. No.: 677,255

[22] Filed: Dec. 3, 1984

[30] Foreign Application Priority Data

Dec. 6, 1983 [CS] Czechoslovakia ............... 9131-83
Jan. 31, 1984 [CS] Czechoslovakia ............... 676-84

[51] Int. Cl.$^4$ ............................................. B29D 11/00
[52] U.S. Cl. ............................................. 425/145; 65/302; 264/2.1; 425/434; 425/808
[58] Field of Search ............... 264/310, 311, 2.1, 1.1, 264/297, 83, 85; 432/125; 65/71, 302; 164/259, 286; 222/152; 425/203, 73, 808, 434, 210, 3, DIG. 33, 259, 261, 425, 453, 454

[56] References Cited

U.S. PATENT DOCUMENTS 4,517,140  5/1985  Rawlings ............... 425/808
4,551,086 11/1985  Rawlings ............... 425/808

Primary Examiner—Jay H. Woo
Assistant Examiner—J. Fortenberry
Attorney, Agent, or Firm—Hoffmann, Dilworth, Barrese & Baron

[57] ABSTRACT

An apparatus is provided for inserting molds containing a dosed monomeric mixture into a rotating polymerizing column by means of an alternate pushing and releasing of a column of molds falling from tubular magazines connected to said polymerizing column. Said apparatus comprises a body fabricated from a non-magnetic material which is adapted on its lower end for a firm affixation to the column and on its upper end for affixation to the magazine, and being provided with a through-opening of a diameter which is larger than the diameter of the molds, another through-hole, leading to said through-opening, which is formed perpendicularly to the axis of the said through-opening, movable jaws being movable one against the other and moved in the direction of the center by springs, and two stationary blocks placed outside said body in an opposite position while at least the outer ends of the jaws and the stationary blocks are constructed from materials which provide a mutual counterpole magnetic interaction. The apparatus may also be provided with means for eliminating the mutual counterpole magnetic interaction of the ends of the jaws and stationary blocks in accordance with the height of the column of the molds in the polymerizing column.

8 Claims, 2 Drawing Figures

APPARATUS FOR INSERTING MOLDS FILLED WITH A MONOMER MIXTURE INTO ROTATING POLYMERIZATION COLUMNS

BACKGROUND OF THE INVENTION

The invention relates to an apparatus for inserting mold filled with a monomer mixture into rotating polymerization columns, by means of an alternating pushing and release of a column of moulds falling down from tubular magazines connected to the said polymerization column. This apparatus is applied especially for the production of contact lenses.

In the continuous centrifugal casting of contact lenses or other articles by polymerizing monomeric mixtures which are dosed into casting molds in advance, it is necessary to substantially removed oxygen from the molds which are advanced into a polymerization zone of the rotating column by flushing with an inert gas. This objective may best be achieved by a gradual release of individual molds containing a monomer mixture from their magazines while permitting the released molds, to fall freely into an upper empty section of the column against a flow of inert gas. The molds, while they are in their magazines and during their individual insertion therein as well, should be continuously kept in a rotating motion which prevents the monomeric mixture from flowing down from the circumference of the casting mold. In addition to complex mechanical systems which employ common construction elements, a relatively simple device is known wherein the gradual release of individual molds from the rotating tubular magazine is achieved by an alternating closing and releasing of springs positioned above the inlet of the column. This device complies with the required tasks but it has a rather high failure rate due to the fatigue of the springs which are very much stressed and become periodically deformed. This prior art mechanism also slowed down the column rotation in an unpredictable way thus causing fluctuation of its rotational speed.

SUMMARY OF THE INVENTION

The invention relates to an apparatus for inserting molds containing a dosed monomeric mixture into rotating polymerization columns by means of the alternate pushing and releasing of a column of molds falling from tubular magazines connected to said polymerization column, wherein said apparatus consists of a body made of a non-magnetic material, which is adapted on its lower end for a firm fixing to the column and the upper end of which is adapted to be fixed to the magazine, and which is provided with a through-opening with the diameter being larger, preferably by 0.01 to 0.5 mm, than the diameter of the molds. Another through-hole, leading into the said through-opening, is formed perpendicularly to the axis of the said through-opening in which jaws are arranged, said jaws being movable one against the other and forced by means of springs in the direction of the center. Outside said body of now magnetic material, in opposite positions, there are situated two stationary blocks. At least the outer ends of the jaws and stationary blocks are constructed with materials which exhibit a mutual counterpole magnetic interaction and thus cause an attraction of the jaws to the stationary blocks.

The jaws may be advantageously made, in part or in whole, of a magnetic material and the stationary blocks may be made of any ferromagnetic material such that the jaws may be attracted to the blocks by placing them nearer the stationary blocks.

The device may also be provided with means for eliminating the mutual counterpole interaction of the ends of the jaws and stationary blocks.

This means for eliminating the mutual counterpole interaction may consist of a mechanism for taking away the stationary blocks between two extreme positions limited by end switches, or of a mask constructed from a ferromagnatic material inserted between the stationary blocks and the rotor of an inserter and an electromagnetic or mechanical mechanism for inserting or withdrawing the mask. The means for eliminating the mutual counterpole interaction may be also provided by a switch of current supplied to the winding for the magnetic saturation of the stationary blocks.

The device according to the invention provides the reliable individual insertion of molds into the column by holding the column of molds at the outlet from the tubular magazines into the column with two opposite jaws, which rotate together with the column and which are alternately released for a brief moment by attracting the stationary blocks which are progressively withdrawn to the outside of the column in close proximation therewith.

Another advantage of the device according to the invention resides in a complete absence of mechanical failure because it does not include any elements stressed by an extensive elastic deformation at a higher frequency.

An advantage of the automaticly controlled insertion of molds, according to the invention resides, above all, in maintaining constant polymerization conditions within the column, which improves, assuming other operation conditions are kept constant, the uniformity and quality of produced contact lenses. It prevents the column from overfilling with molds to the level of the inserter which would eliminate the empty space of the column, such space being required to achieve a thorough flushing of the molds with nitrogen. It also prevents the column from an undue discharge which would cause a falling of the molds directly into the polymerization zone of the column and thus an undesired premature initiation of polymerization before the rotating meniscus is prefectly stabilized in accordance with the predetermined constant speed of rotation. Both these drawbacks may cause unacceptable deviations in the lens parameters and even their complete rejection, particularly in the case of the production of the most desired type of ultra-thin lenses where requirements for a constant period for stabilizing the meniscus and for a substantially inert atmosphere are absolutely critical.

Another advantage of the invention related to the aforesaid advantage resides in a reduction in the degree of operator attendance required as an operator must only see to it that a magazine with a sufficient number of molds filled with a monomer mixture is above the level of the inserter at all times. The responsibility of the operator in this regard can be further alleviated by placing another identical or similar sensor below the sensor providing pulses for locking or releasing the mold passage. Said other sensor may actuate, by means of an amplified current of a photodiode, a light or audio signal for the operator. This signal appears only if the magazine is empty above the level of the inserter and if no additional mold falls into the column even if the insertion mechanism, controlled by the upper sensor, is released.

BRIEF DESCRIPTION OF THE DRAWINGS

In order that the invention may be clearly understood and readily carried into effect, a preferred embodiment thereof is, by way of example, hereinafter more fully described and illustrated in the accompanying drawing, in which.

DESCRIPTION OF THE PREFERRED EMBODIMENTS

Figure 1:
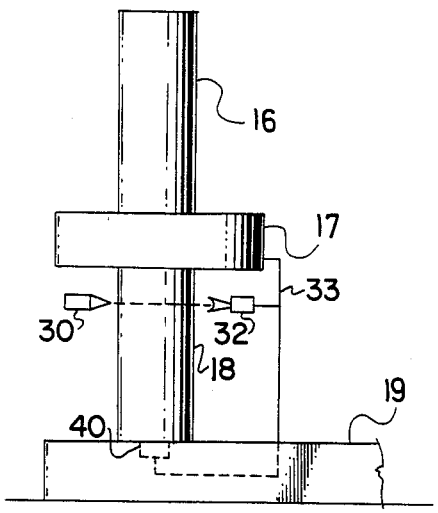
FIG. 1 shows an orientation block diagram of an arrangement of a polymerizing column with a drive, magazine of molds and device for inserting molds according to the invention.

In FIG. 1 polymerizing column 18 is driven by a drive 19. Said polymerizing column 18 is connected to magazine 16 of molds by means of a device 17 for inserting molds.

Figure 2:
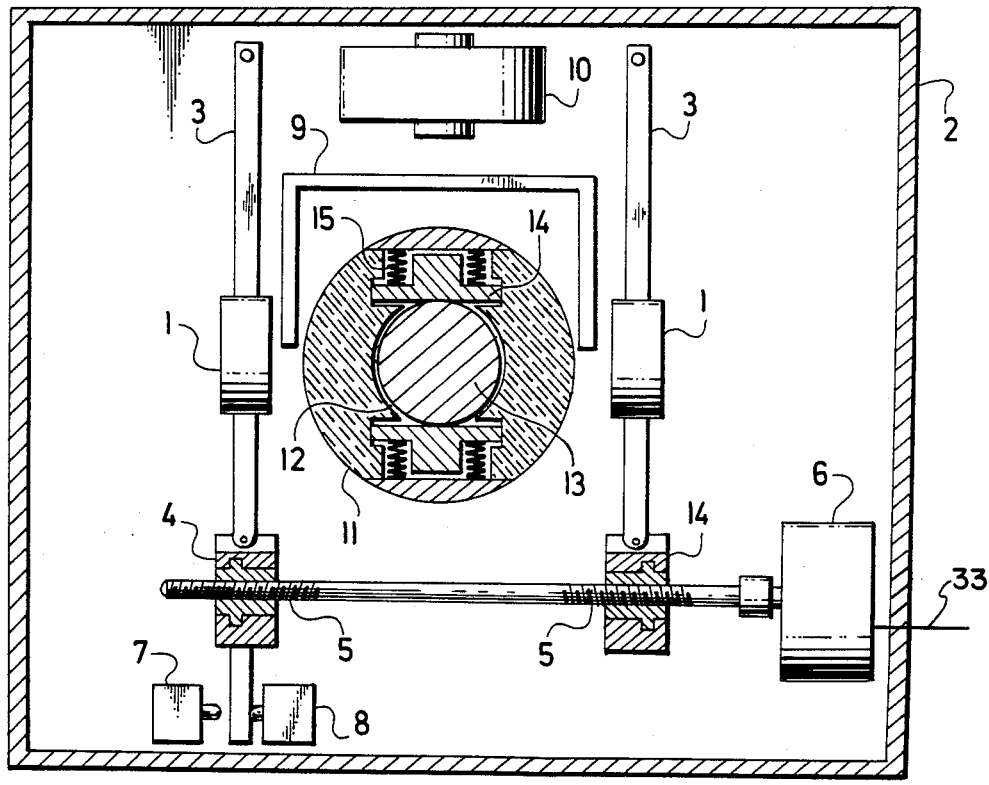
FIG. 2 shows a schematic sketch of the device according to the invention in a plan and partial section.

In FIG. 2 a mechanism for releasing molds is shown which consists of a body 11 made of a non-magnetic material, e.g., of organic glass. Said body is firmly connected to the upper end of the rotating column (not shown) and connects the column to the above-situated tubuluar magazine of molds (also not shown) but which is carried along in coincident rotation with the column. Body 11 is provided with a through-opening 12 of a larger diameter than the diameter of molds 13. Molds 13 freely pass through said through-opening 12 if they are not clamped by opposite jaws 14 forced together by springs 15. Outside body 11, on opposite sides, there are arranged two magnets 1 which are fixed to swinging arms 3 the position of which is limited by rotatable nuts 4 provided with a right-hand thread and a left-hand thread, respectively. Corresponding screws 5 pass through these nuts with their rotation being controlled by a servomotor 6. End switches 7 and 8 inactivate the servomotor in the extreme positions of nuts 4 or arms 3. Between these magnets 1 and body 2 there are arranged arms of a mask 9 made of a steel sheet, formed in a U-shape. Jaws 14 of the mechanism for inserting molds 13 may be formed, e.g., by steel blocks or jaws firmly fixed to ferrite magnets which approach the circumference of body 11. Outside body 11 on opposite sides the there are situated two stationary blocks advantageously provided as stable magnets 1. At the moment when jaws 14 pass by magnets 1, they are attracted to the circumference and thus they release the column of molds in a free fall. The time of release at for a designed rotational speed of 400 r.p.m. is so short, that the molds are shifted only by a fraction of height of one mold 13 and fall into the column in regular intervals of about one second. This is sufficient to accomplish their being substantially completely flushed with a flow of nitrogen during passage through an empty zone within the polymerizing column.

The period of release of jaws 14 may be varied by the shape and field strength of magnets 1 as well as their distance from rotating body 11. Instead of permanent magnets, there may also be used electromagnets in which case the timing interval for insertion of the molds may be continuously varied by changing the voltage.

The magnetic insertion device may be employed, according to the invention, not only for a separate insertion of individual molds but also for an automatic filling of column 18 with molds 13 up to an optimum height. An impulse for reducing or eliminating the strength of the magnetic field of the inserter means can be obtained in a variety of ways:

If the upper part of the rotating polymerizing column 18 is made of a light-transmitting material, e.g., glass, a horizontally directed light source 30 aimed along the column axis to an opposite sensor/photodiode 32 can be placed at the height corresponding to the optimum level of molds 13 in the column. If the moulds 13 exceed this position, this situation is responded to by lowering the current intensity in line 33 from the photodiode which causes, for example, by means of an electronic relay, a switching on of a servomotor which retracts the stationary magnets 1 up to the point of contact with end switch 7. Correspondingly, a drop in the level of the molds 7 within the column to below said position causes an increase in the current of the photodiode, which gives, after amplification by the same relay system, a signal to reverse the motion of servomotor 6 which repositions magnets 1 up to the limit of their travel as controlled by second switch 8.

The impulse for inserting further molds 13, or, on the contrary, for interrupting their insertion may be also derived from the pressure which is produced by the column of rotating moulds 13 on the bottom of the column. A decrease in weight of the entire mold column caused by its reduction below the desired height affects a pressure sensor on which there rests the column of molds and which controls again the position of magnets 1 of the mechanism for inserting molds 13, such as through line 33.

The necessary impulses may be optionally obtained from the changing resistance exerted by a mold column of varying height to a protective gas flowing inside column 18 along the mold column. If the inlet of nitrogen to the bottom of the column is made substantially constant, the pressure difference at this inlet depends only upon the height of the mold column because nitrogen flows freely into the atmosphere above inserting device 17.

Sensing the rotation of servomotor 6 is achieved by a relay system of a common type according to an impulse received from a sensor within the column. A permanent locking or release of the passage of a mold through the mold column by the inserting mechanism 13 may be accomplished manually by providing pushbuttons or other switches which override the sensor if such becomes necessary due to an emergency.

The control of the magnetic field of fixed stationary magnets 1 may be achieved by inserting mask 9 between rotor of inserting mechanism and magnets 1. In this example, mask 9 is withdrawn from the range of attraction of magnets 1 by an impulse switching on a current to electromagnet 10 which attracts the mask 9 and thus causing a release of the mold passage. As soon as the signal from sensor of the column 18 stops and the current into electromagnet 10 is interrupted, mask 9 returns by the action of stationary magnets 1, to the position where it interferes with the magnetic action on the rotor of the inserting mechanism and thus it blocks the passage of molds 13. Also here, the passage of molds 13 may be permanently locked or unlocked by manually activating an override switch which results in a flow of current into electromagnet 10.

The invention may be advantageously applied in the production of soft contact lenses.

Although the invention is described and illustrated with reference to one preferred embodiment thereof, it is to be expressly understood that it is in no way limited to the disclosure of such a preferred embodiment, but it is capable of numerous modifications within the scope of the appended claims.

What we claim is:

1. In an apparatus for polymerizing a dosed monomeric mixture in a mold subjected to rotation during said polymerization, said apparatus including a magazine for feeding said molds from a column of molds in said magazine, and a rotatable polymerizing column in which said polymerization takes place, an improved mold insertion device for inserting said molds by clamping and releasing said column of molds falling from said magazine comprising:

a body made of non-magnetic material and adapted to be secured to the lower end of said magazine and to the upper end of said column for coincidental rotation of said magazine, said column, and said body, said body having a first through-opening along a linear axis from said magazine to said column, said through-opening having a cross-sectional dimension greater than the transverse cross-sectional dimension of said molds, a second through-opening in said body oriented substantially perpendicularly to said linear axis of said first through-opening and capable of accommodating jaw means, jaw means mounted in said second through-opening for reciprocal movement between a clamping position against molds falling into said insertion device from said magazine and a release position which releases said molds, said jaws biased toward said clamping position, and said jaws having first means for providing magnetic attraction, release actuating means provided at a position outside said body adjacent said jaw means, said release actuating means having a second means for providing magnetic attractions for magnetic counterpole interaction with said first magnetic means in said jaws sufficient to pull said jaws from said clamping position to said release position, whereby said mold clamped in said jaw means is released upon actuation of said release actuating means.

2. The device of claim 1 wherein said actuating means further comprises means for eliminating mutual counterpole interaction between said jaw and said first and said second means for magnetic attraction.

3. The device of claim 2 wherein said means for eliminating said mutual counterpole interaction comprises a mechanism for removing said second means for magnetic attraction from said position adjacent said jaws in said body.

4. The device of claim 2 wherein said means for eliminating said mutual counterpole interaction comprises a mask inserted between said first and said second magnetic attraction means.

5. The device of claim 2 wherein said means for eliminating said mutual counterpole interaction comprises a winding on said second magnetic attraction means to which a current is supplied to obtain magnetic saturation of said magnetic pole means.

6. The device of claim 2 wherein said polymerizing column is light-transmitting which further comprises a light source and light-sensitive sensor fixed in opposite positions with said polymerizing column therebetween for controlled signaling of said counterpole interaction.

7. The device of claim 5 wherein said signal eliminates counterpole interaction in response to said molds reaching above said fixed position and lowering of the current intensity from said sensor, whereby said jaws remain in said clamping position.

8. The device of claim 2 which further comprises a pressure sensor arranged in the bottom of said polymerizing column which sends a signal for eliminating said counterpole interaction in response to the weight of a column of a predetermined number of molds, whereby said jaws remain in said clamping position.

* * * * *

UNITED STATES PATENT AND TRADEMARK OFFICE
CERTIFICATE OF CORRECTION

PATENT NO. : 4,609,337

DATED : September 2, 1986

INVENTOR(S) : Wichterle et al.

It is certified that error appears in the above-identified patent and that said Letters Patent are hereby corrected as shown below:

Column 1, Line 59, "now magnetic" should read --non-magnetic--.

Signed and Sealed this

Sixteenth Day of December, 1986

Attest:

DONALD J. QUIGG

Attesting Officer   Commissioner of Patents and Trademarks